(12) United States Patent
Klausner et al.

(10) Patent No.: US 9,550,685 B2
(45) Date of Patent: Jan. 24, 2017

(54) DESALINATION APPARATUS AND PROCESS

(75) Inventors: James Frederick Klausner, Gainesville, FL (US); Renwei Mei, Gainesville, FL (US); Srinivas S. Garimella, Pittsburgh, PA (US); Donald P. Ziegler, Quebec (CA)

(73) Assignees: UNIVERSITY OF FLORIDA RESEARCH FOUNDATION, INC., Gainesville, FL (US); ALCOA INC., Alcoa Center, PA (US)

( * ) Notice: Subject to any disclaimer, the term of this patent is extended or adjusted under 35 U.S.C. 154(b) by 1175 days.

(21) Appl. No.: 13/062,398

(22) PCT Filed: Aug. 31, 2009

(86) PCT No.: PCT/US2009/055511
§ 371 (c)(1),
(2), (4) Date: Mar. 4, 2011

(87) PCT Pub. No.: WO2010/027938
PCT Pub. Date: Mar. 11, 2010

(65) Prior Publication Data
US 2011/0168540 A1    Jul. 14, 2011

Related U.S. Application Data

(60) Provisional application No. 61/094,093, filed on Sep. 4, 2008.

(51) Int. Cl.
*B01D 53/50* (2006.01)
*C02F 1/04* (2006.01)
(Continued)

(52) U.S. Cl.
CPC .............. *C02F 1/04* (2013.01); *B01D 1/0058* (2013.01); *B01D 1/16* (2013.01); *B01D 1/22* (2013.01);
(Continued)

(58) Field of Classification Search
None
See application file for complete search history.

(56) References Cited

U.S. PATENT DOCUMENTS 4,181,506 A     1/1980  Bengtsson
4,999,172 A *   3/1991  Simons ..................... 423/226
(Continued)

FOREIGN PATENT DOCUMENTS

JP      9239233 A1    9/1997
JP      11057396 A1   3/1999
(Continued)

OTHER PUBLICATIONS

International Preliminary Report on Patentability for PCT/2009/055511 International Filing Date Aug. 31, 2009; Mailing date Mar. 8, 2011—5 pages.

(Continued)

*Primary Examiner* — Duane Smith
*Assistant Examiner* — Phillip Shao
(74) *Attorney, Agent, or Firm* — Cantor Colburn LLP

(57) ABSTRACT

Disclosed herein are an apparatus and a process that can be used to remove sulfur dioxide other environmentally hazardous contaminants from a gaseous waste stream while at the same time providing a source of purified water. The process can be used for the desalination of sea or brackish water, or for the concentration of contaminated waste water. The method comprises feeding a gaseous waste stream that comprises sulfur dioxide into a diffusion tower. Feed water is sprayed onto a packing material in the diffusion tower to form a thin film of feed water on a surface of the packing material. Sulfur dioxide diffuses into the thin film of feed water to form water that contains sulfur dioxide. The gaseous waste stream is simultaneously humidified. The (Continued)

humidified gaseous waste stream is then subjected to direct contact condensation to obtain purified water.

8 Claims, 9 Drawing Sheets

(51) Int. Cl.
| | |
|---|---|
| *B01D 1/00* | (2006.01) |
| *B01D 1/16* | (2006.01) |
| *B01D 1/22* | (2006.01) |
| *B01D 5/00* | (2006.01) |
| *C02F 1/08* | (2006.01) |
| *C02F 1/16* | (2006.01) |
| *C02F 1/66* | (2006.01) |
| *C02F 101/10* | (2006.01) |
| *C02F 103/08* | (2006.01) |
| *C02F 103/16* | (2006.01) |
| *C02F 103/18* | (2006.01) |

(52) U.S. Cl.
CPC ............ *B01D 5/006* (2013.01); *B01D 53/507* (2013.01); *C02F 1/08* (2013.01); *B01D 2257/302* (2013.01); *C02F 1/048* (2013.01); *C02F 1/16* (2013.01); *C02F 1/66* (2013.01); *C02F 2101/101* (2013.01); *C02F 2103/08* (2013.01); *C02F 2103/16* (2013.01); *C02F 2103/18* (2013.01); *C02F 2209/05* (2013.01)

(56) References Cited

U.S. PATENT DOCUMENTS

| | | | | |
|---|---|---|---|---|
| 5,259,931 | A * | 11/1993 | Fox | 202/83 |
| 5,296,205 | A * | 3/1994 | Hardison | 423/220 |
| 5,414,199 | A * | 5/1995 | Fleischman | 588/320 |
| 5,651,917 | A * | 7/1997 | Bridges et al. | 252/186.41 |
| 5,756,047 | A * | 5/1998 | West et al. | 422/37 |
| 5,916,492 | A * | 6/1999 | Bischoff et al. | 261/94 |
| 6,623,620 | B2 * | 9/2003 | Lai | G01N 33/0042 204/426 |
| 6,919,000 | B2 | 7/2005 | Klausner et al. | |
| 7,225,620 | B2 | 6/2007 | Klausner et al. | |
| 2005/0230238 | A1 * | 10/2005 | Klausner et al. | 203/10 |
| 2005/0258557 | A1 * | 11/2005 | Davis et al. | 261/94 |
| 2006/0244159 | A1 * | 11/2006 | White et al. | 261/94 |
| 2010/0024647 | A1 * | 2/2010 | Gunther | 95/183 |

FOREIGN PATENT DOCUMENTS

| | | |
|---|---|---|
| JP | 2000354732 A1 | 12/2000 |
| JP | 2003126659 A1 | 5/2003 |

OTHER PUBLICATIONS

International Search Report for PCT/2009/055511 International Filing Date Aug. 31, 2009; Mailing date Apr. 9, 2010—3 pages.
Written Opinion for PCT/2009/055511 International Filing Date Aug. 31, 2009; Mailing date Apr. 9, 2010—4 pages.
International Search Report dated Apr. 9, 2010 for International Application PCT/US2009/055511.
Written Opinion of the International Searching Authority mailed Apr. 9, 2010 for International Application No. PCT/US2009/055511.

* cited by examiner

DESALINATION APPARATUS AND PROCESS

CROSS-REFERENCE TO RELATED APPLICATIONS

This application claims priority to U.S. Patent Application No. 61/094,093, filed on Sep. 4, 2008, and to PCT/US2009/055511 filed on Aug. 31, 2009, the content of which in its entirety is herein incorporated by reference.

BACKGROUND

This disclosure relates to a desalination apparatus and a process that can be used to remove sulfur dioxide and other environmentally hazardous contaminants from a gaseous waste stream while at the same time providing a source of purified water and providing a means to dispose of contaminated water.

Metal smelting operations generally produce a large amount of byproduct gases during the conversion of the metal ore into a metal. For example, in the smelting of aluminum from alumina, byproduct gases that comprise carbon dioxide ($CO_2$) and sulfur dioxide are produced at the rate of about 500,000 to about 1,800,000 cubic feet per minute depending upon the size of the plant. These byproduct gases are generally released into the atmosphere at temperatures of about 80 to about 100° C.

Sulfur dioxide is an environmentally hazardous contaminant that facilitates the production of acid rain. It is therefore desirable to remove sulfur dioxide from the byproduct gases that are released into the atmosphere.

In addition, the discharge of water that has been contaminated through contact with various parts of the process in smelting plants may pose an environmental hazard. It is therefore desirable to concentrate contaminants in such waters to as high a level as possible, thus limiting the amount of water that needs to be disposed of or processed further.

SUMMARY

Disclosed herein is a method comprising feeding a gaseous waste stream into a diffusion tower; the gaseous waste stream comprising sulfur dioxide; feeding feed water onto a packing material in the diffusion tower; forming a thin film of feed water on a surface of the packing material; diffusing the sulfur dioxide into the thin film of feed water to form water that contains sulfur dioxide; humidifying the gaseous waste stream; feeding the water that contains sulfur dioxide to the outside; and direct contact condensing the humidified gaseous waste stream to obtain purified water.

Disclosed herein too is an apparatus comprising a source for a gaseous waste stream; the gaseous waste stream comprising sulfur dioxide; a diffusion tower that is operative to receive feed water and the gaseous waste stream; the feed water and the gaseous waste stream being configured to flow countercurrent to each other in the diffusion tower; the diffusion tower being disposed downstream of the source for the gaseous waste stream and in fluid communication with the source for the gaseous waste stream; the diffusion tower being operative to effect a transfer of sulfur dioxide from the gaseous waste stream to the feed water as well as to form a humidified gaseous waste stream; and a direct contact condenser in fluid communication with the diffusion tower; the direct contact condenser being operative to receive the humidified gaseous waste stream from the diffusion tower and condensing the humidified gaseous waste stream, wherein purified water is produced upon condensation of the humidified gaseous waste stream.

DETAILED DESCRIPTION

Figure 1:
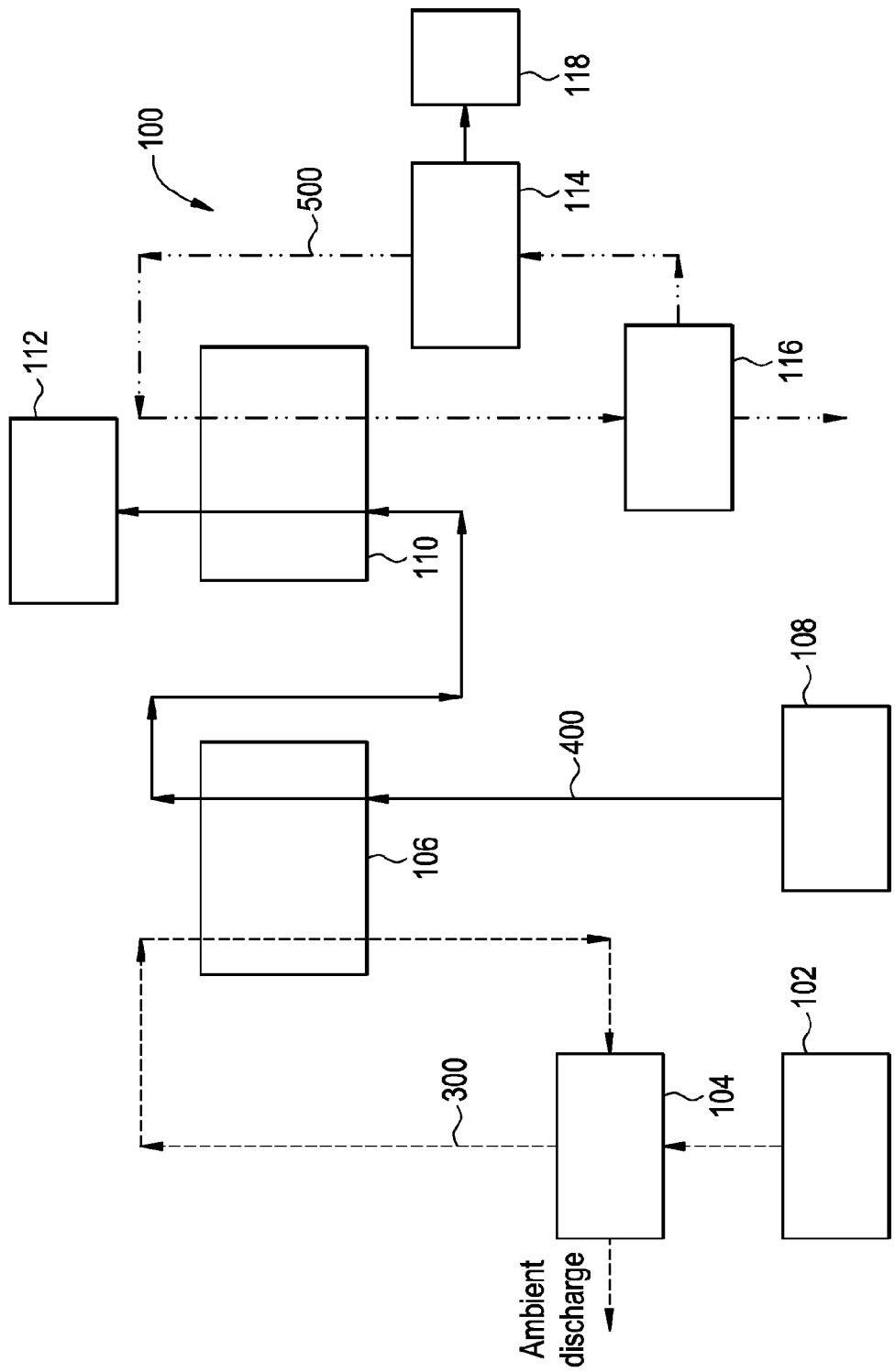
FIG. 1 is an exemplary schematic diagram of the desalination apparatus that can be used to remove sulfur dioxide from a gaseous waste stream.

It is to be noted that as used herein, the terms "first," "second," and the like do not denote any order or importance, but rather are used to distinguish one element from another, and the terms "the", "a" and "an" do not denote a limitation of quantity, but rather denote the presence of at least one of the referenced item. Furthermore, all ranges disclosed herein are inclusive of the endpoints and independently combinable.

Furthermore, in describing the arrangement of components in embodiments of the present disclosure, the terms "upstream" and "downstream" are used. These terms have their ordinary meaning. For example, an "upstream" device as used herein refers to a device producing a fluid output stream that is fed to a "downstream" device. Moreover, the "downstream" device is the device receiving the output from the "upstream" device. However, it will be apparent to those skilled in the art that a device may be both "upstream" and "downstream" of the same device in certain configurations, e.g., a system comprising a recirculating loop. The recirculating loop is also sometimes referred to as a recycle loop.

Disclosed herein is an apparatus and a method for removing sulfur dioxide from a gaseous waste stream. The apparatus and the method may also be operated to simultaneously decrease the volume of a waste-water stream. The gaseous waste stream is generally a waste stream from an industrial facility that comprises carbon dioxide and sulfur dioxide. The method advantageously comprises mixing feed water with the gaseous waste stream in the diffusion tower of a Diffusion Driven Desalination (DDD) process and extracting contaminants such as sulfur dioxide from the gaseous waste stream.

The feed water may be saline water or some other source of contaminated water. The combination of the production of fresh water with the removal of sulfur dioxide from the gas stream and the simultaneous desalination or processing of contaminated water provides a means of reducing the total cost of waste treatment and fresh water production. It also provides an advantageous method for preventing the emission of sulfur dioxide into the atmosphere.

When a gaseous waste stream comprising carbon dioxide and sulfur dioxide contacts the feed water, a portion of the sulfur dioxide is scrubbed from the gaseous waste stream. The natural alkalinity of seawater in terms of carbonate ions and bicarbonate ions is very useful for scrubbing gaseous waste streams or flue gases of sulfur dioxide. In another embodiment, additional alkalizing agents such as sodium carbonate or sodium hydrozide may be added to the feed water stream to enhance the scrubbing of sulfur dioxide.

The major constituents of seawater are listed in Table 1. Every ton of seawater contains approximately 0.9 kilograms of sulfur.

TABLE 1

| Constituent (as Dissolved ion) | Concentration in Sea Water (g/kg) |
|---|---|
| Chloride (Cl$^-$) | 19.35 |
| Sodium (Na$^+$) | 10.76 |
| Sulfate (SO$_4^{2-}$) | 2.71 |
| Magnesium (Mg$^{2+}$) | 1.29 |
| Calcium (Ca$^{2+}$) | 0.411 |
| Potassium (K$^+$) | 0.4 |
| Bicarbonate (HCO$_3^-$) | 0.142 |

The absorption of sulfur dioxide (SO$_2$) into the feed water involves the following processes: diffusion of gas towards a gas/liquid interface, diffusion and chemical reaction within the liquid film near the interface, and the chemical reaction within the bulk liquid. Without being limited by theory, a set of chemical reactions that are hypothesized to model the process are detailed in the equations I to VI below:

$$SO_2(g) + H_2O \leftrightarrow H^+ + HSO_3^- \qquad (I)$$

$$HSO_3^- \leftrightarrow H^+ + SO_3^{2-} \qquad (II)$$

$$HSO_3^- + \frac{1}{2}O_2 \leftrightarrow SO_4^{2-} + H^+ \qquad (III)$$

$$SO_3^{2-} + \frac{1}{2}O_2 \leftrightarrow SO_4^{2-} \qquad (IV)$$

$$HCO_3^- + H^+ \leftrightarrow CO_2 + H_2O \qquad (V)$$

$$CO_3^{2-} + 2H^+ \leftrightarrow CO_2 + H_2O \qquad (VI)$$

According to this sequence of reactions, the carbonate (HCO$_3^-$) serves to neutralize the acid formation in the water stream. It is also noted that fresh water may contain a significant amount of bicarbonate or carbonate, which may be sufficient to also neutralize the acid formation. The aforementioned set of reactions described by the equations (I)-(VI) are expected to occur within the diffusion tower.

As noted above, the gaseous waste stream comprises carbon dioxide. Carbon dioxide can exist in water in many forms. These are described in the equations (VII)-(XII) as follows:

Carbon dioxide may dissolve in water $$CO_2(g) \rightarrow CO_2(aq) \qquad (VII)$$

following which, equilibrium is established between the dissolved CO$_2$ and H$_2$CO$_3$, carbonic acid.

$$CO_2(aq) + H_2O(l) \leftrightarrow H_2CO_3(aq) \qquad (VIII)$$

Only about 1% of the dissolved CO$_2$ exists as H$_2$CO$_3$. Carbonic acid is a weak acid that dissociates in two steps.

$$H_2CO_3(aq) \leftrightarrow H^+ + HCO_3^- \qquad (IX)$$

$$HCO_3^- \leftrightarrow H^+ + CO_3^- \qquad (X)$$

The carbonate anions (CO$_3^{2-}$) can interact with the cations present in the water to form insoluble carbonates. For instance, if Ca$^{2+}$ is present, limestone (CaCO$_3$) is formed and if Mg$^{2+}$ is present then MgCO$_3$ is formed. The formation of these deposits serve an additional driving force that can drive the equilibrium in equation (X) more to the right resulting in acidification of the water.

$$Ca^{2+} + CO_3^{2-} \leftrightarrow CaCO_3 \downarrow \qquad (XI)$$

$$Mg^{2+} + CO_3^{2-} \leftrightarrow MgCO_3 \downarrow \qquad (XII)$$

Without being limited by theory, the aforementioned set of reactions, equations (VII)-(XII) are expected to occur in both the diffusion tower and the direct contact condenser. In addition, with time the carbonate anions in the condenser water, which are unstable, will react with hydrogen ions to produce CO$_2$ and water.

With reference now to the FIG. 1, an exemplary diffusion driven desalination (DDD) system 100 for extracting contaminants comprises a feed water supply 102, an optional first heat exchanger 104, a diffusion tower 106, a source for the gaseous waste stream 108, a direct contact condenser 110, an ambient discharge 112, a heat exchanger 114, a collection tank 116, and an ambient heat rejection device 118.

In one embodiment, the system 100 comprises three flow paths, namely, a feed water flow path 300, a gaseous waste stream path 400 and a fresh water stream path 500. The feed water flow path 300 comprises the feed water supply 102, the diffusion tower 106 and the optional first heat exchanger 104. The optional first heat exchanger 104 and the diffusion tower 106 lie downstream of the water supply 102 and are in fluid communication with the water supply 102. In one embodiment, the optional first heat exchanger 104 and the diffusion tower 106 can lie in a recirculating loop. The water supply 102 is used to feed freshwater, contaminated freshwater (hereinafter contaminated water), seawater or a combination of freshwater, contaminated freshwater and seawater (hereinafter feed water) to the optional first heat exchanger 104, where it is heated. The heated feed water is then fed to the diffusion tower 106. In the diffusion tower 106, the heated feed water contacts the gaseous waste stream and a portion of the feed water is evaporated into the gaseous waste stream to form a humidified air stream. A portion of the sulfur dioxide is dissolved in the feed water to form sulfur dioxide containing water, which then collects at the bottom of the diffusion tower 106 and is recycled to the first heat exchanger 104. After leaving the first heat exchanger 104 it can be treated to neutralize or otherwise render the sulfur dioxide innocuous and then fed to the outside.

It is to be noted that the use of the term "optional" with regard to the first heat exchanger 104 means that the feed water can be recycled from the diffusion tower 106 to the water supply 102 directly without the use of the first heat exchanger 104. The system 100 is said to be operating in the "recycle mode" when the heat exchanger 104 is excluded from the system 100.

It is generally desirable for the feed water that is fed to the diffusion tower 106 to have a temperature that is greater than the ambient temperature. In one embodiment, the feed water that is fed to the diffusion tower is heated to a temperature of about 30 to about 100° C. In an exemplary embodiment, the feed water that is fed to the diffusion tower 106 has a temperature of about 35° C. to about 65° C., specifically about 40 to about 50° C.

The gaseous waste stream path 400 comprises the source for the gaseous waste stream 108, the diffusion tower 106 the direct contact condenser 110 and the ambient discharge 112. The source for the gaseous waste stream 108 can be an industrial waste stream. In an exemplary embodiment, the source for the gaseous waste stream 108 can comprise a gaseous byproduct waste stream derived from the smelting of aluminum from alumina. The gaseous waste stream can comprise carbon dioxide and sulfur dioxide in addition to other gases. Examples of contaminated water obtained from an industrial facility that conducts smelting includes the water used to cool ingots in a cast house, the water used to scrub roof emissions from a pot room, water used in an anode plant, plant site runoff, and the like.

As can be seen in the FIG. 1, the ambient discharge 112 lies downstream of the direct contact condenser 110. The direct contact condenser 110 lies downstream of the diffusion tower 106 and is in fluid communication with it. The diffusion tower 106 lies downstream of the source for the gaseous waste stream 108 and is in fluid communication with it. A forced draft blower (not shown) located downstream of the source for the gaseous waste stream 108 blows the gaseous waste to the bottom of the diffusion tower 106. The heated feed water and the gaseous waste meet in a packed bed in the diffusion tower 106, where the feed water dissolves sulfur dioxide present in the gaseous waste stream as described above. The gaseous waste is humidified in the diffusion tower. The humidified gaseous waste is then fed to the direct contact condenser 110.

As can be seen in the FIG. 1, the fresh water stream path 500 comprises the collection tank 116, the direct contact condenser 110, the heat exchanger 114 and the ambient heat rejection device 118 all of which are in fluid communication with one another. The collection tank 116, the direct contact condenser 110 and the heat exchanger 114 form a recirculating loop with the heat exchanger 114 located downstream of the collection tank 116, while the direct contact condenser 110 is located downstream of the heat exchanger 114. The collection tank 116 contains fresh water, which is sprayed in a counter current direction to the direction of the humidified gaseous waste in the direct contact condenser 110. The cold fresh water and the warm humidified gaseous waste meet in a packed bed of the direct contact condenser where the vapor in the humidified gaseous waste is condensed out. The gaseous waste stream exits the direct contact condenser and is discharged as exhaust. The fresh (purified) water is recycled to the collection tank, where a portion of it may be extracted as fresh water for various purposes such as drinking, irrigation, or the like, while the remainder is recycled to the second heat exchanger 114 where the heat input to the system is rejected to the ambient heat rejection device 118.

With reference now once again to the water flow path 300 of the FIG. 1, the feed water is heated in the first heat exchanger 104, where heat can be received from a variety of heat sources, including low pressure condensing steam from a power plant, waste heat from a combustion engine, and geothermal heat.

Figure 2:
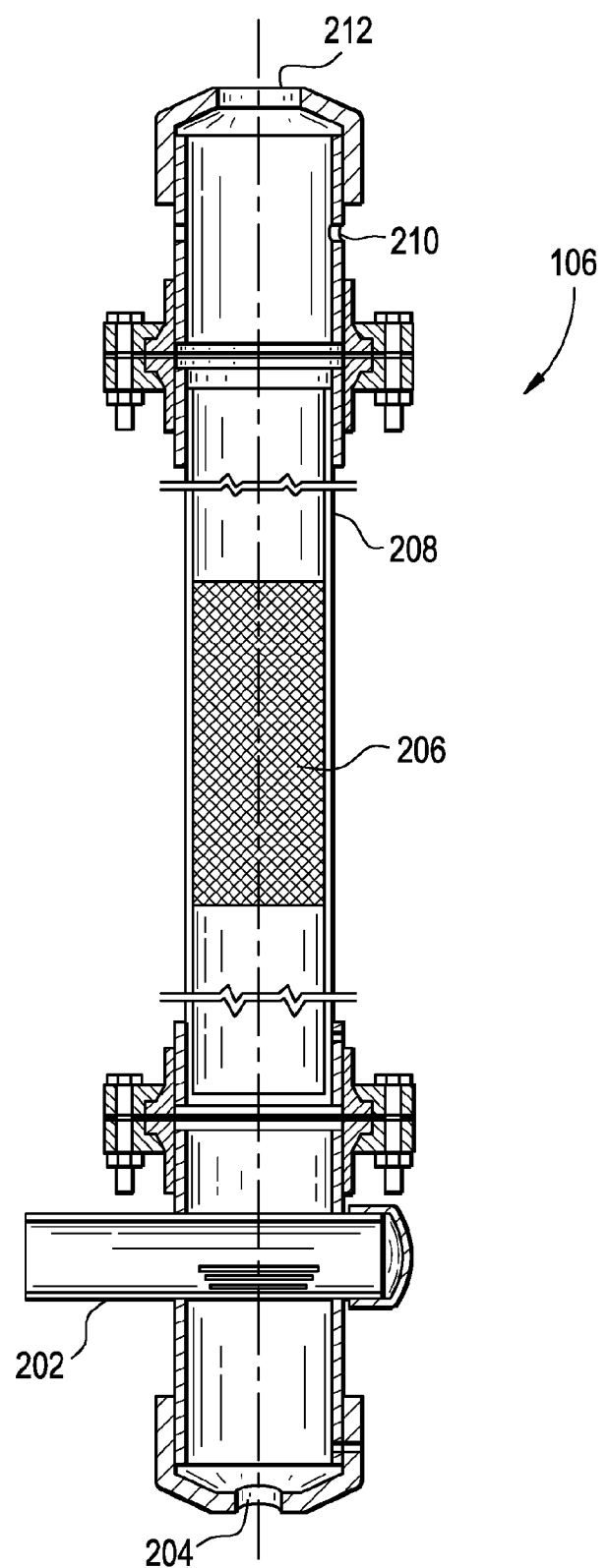
FIG. 2 is an exemplary schematic diagram of the diffusion tower.

With reference now to the FIG. 2, the diffusion tower 106 for humidifying air includes a rigid outer shell 208, an inside volume of the shell including a portion filled with a high surface area packing material 206. At least one inlet 210 is provided for receiving the heated feed water. The diffusion tower 106 further comprises one region where a thin film of feed water forms on the high surface area packing material. At least one inlet 202 is provided for receiving a low humidity gaseous waste stream (the gaseous waste stream). The gaseous waste stream is forced over the thin film of feed water causing water from the thin film to evaporate and diffuse into the air stream to create a humidified air stream. At least one plenum 212 is disposed near a top of the diffusion tower 106 for drawing the humidified gaseous waste stream out from the diffusion tower 106 so that it can be condensed.

As noted above, the at least one inlet 210 used for introducing the feed water is located near the top of the diffusion tower 106. A port 204 located near the bottom of the diffusion tower 106 is used for feeding the feed water having sulfur dioxide dissolved therein to the first heat exchanger 104.

The diffusion tower 106 is preferably designed such that the gaseous waste stream leaving the tower 106 should be fully saturated with moisture. The purpose of heating the feed water prior to entering the diffusion tower 106 is that the rate of diffusion and the exit humidity ratio increases with increasing temperature, thus yielding greater water production. In the diffusion tower 106, sulfur dioxide and carbon dioxide present in the gaseous waste stream are dissolved into the feed water. The feed water, which is not evaporated in the diffusion tower 106 is preferably collected at the bottom of the tower and can be removed with a pump (not shown). The sulfur dioxide can be removed in a scrubber (not shown), while the feed water (without the sulfur dioxide) can be discharged to the outside.

In one embodiment, in one method of using the diffusion tower 106, the feed water after being heated in the first heat exchanger 104 is sprayed onto the top of the diffusion tower 106 via the inlet 210. On the bottom of the diffusion tower 106, the gaseous waste stream is pumped in via inlet 202, such as by a forced draft blower (not shown). The gaseous waste stream may be heated if desired. The water sprayed into the top of the diffusion tower 106 falls counter-currently to the flow of the gaseous waste stream because of the action of gravity. As the heated feed water flows through the diffusion tower 106, a thin film of feed water forms on the surfaces of the packing material. The thin film of water is contacted by the gaseous waste stream flowing upward through the tower 125, which is propelled by the forced draft blower.

As dictated by Fick's law of diffusion and the laws of conservation of mass, momentum, and energy, liquid water will evaporate and diffuse into the air, while air will diffuse into the water, both due to concentration gradients. When the gaseous waste stream contacts the thin films of water formed on the packing material, sulfur dioxide contained in the gaseous waste stream diffuses into the water to form sulfur dioxide containing water. The sulfur dioxide containing water is either fed to the heat exchanger or discharged to the outside. The humidified gaseous waste stream is then fed to the direct contact condenser.

When the feed water comprises seawater, the brine obtained at the bottom of the diffusion tower 106 can be recirculated through the first heat exchanger 104 for recovery of the heat above ambient possessed by the brine. Generally, when the brine temperature exceeds about 30° C. and/or when the brine temperature exceeds the incoming water temperature, the brine is preferably sent to the first heat exchanger 104, otherwise it is preferably simply discharged. If it is expected the feed water temperature will not exceed about 30° C. or that the brine temperature will not exceed the incoming water temperature, the first heat exchanger 104 is generally not included with system 100. In other words, as noted above, the first heat exchanger 104 is optional. With appropriate maintenance it is not expected that scaling of the diffusion tower 106 will pose any significant problem since the brine will wash away residual minerals left behind by the evaporated water.

If the mineral concentration in the brine is high, there is the potential for scaling to occur on the packing material. However, using operating conditions described herein, a low percentage (e.g. less than or equal to 11%) of the feed water is evaporated, which will result in a low mineral concentration in the brine making scaling of the packing material only generally a minimal concern. In the case of operation of the diffusion tower and heat exchanger in a recirculating loop, it is desirable to use a suitable ratio of a discharge flowrate to a recirculation flowrate to prevent the build-up of scale and mineral salts in the process equipment. Periodic cleaning by adjustment of the pH or other chemical means may be desirable.

The gaseous waste entering the diffusion tower 106 is preferably a gaseous waste stream from a metal smelting facility. In one embodiment, the gaseous waste stream is from an aluminum smelting facility. The gaseous waste stream is preferably dried prior to entering the diffusion tower 106. The gaseous waste stream comprises carbon dioxide in an amount of up to about 10 weight percent and sulfur dioxide in an amount of up to about 100 parts per million.

In one embodiment, the mass flow ratio of the feed water to the gaseous waste stream at the respective points of entry into the diffusion tower 106 is about 0.5:1 to about 2:1, specifically about 0.75:1 to about 1.75:1, and more specifically about 0.9:1 to about 1.5:1. In an exemplary embodiment, the mass flow ratio of the feed water to the gaseous waste stream at the respective points of entry into the diffusion tower 106 is about 1:1.

In another embodiment, in order to facilitate the absorption of sulfur dioxide, the pH of the feed water may be increased to about 7 or higher, specifically about 8 or higher, specifically about 9 or higher, and more specifically about 10 or higher. If desired, a suitable buffer such as sodium hydroxide or calcium carbonate may be added to the feed water to increase the alkalinity. This is suitable when the pH in the diffusion tower drops so low that it inhibits diffusion of gaseous sulfur dioxide into the water film. This can be remedied by increasing the alkalinity of the water prior to entering the diffusion tower.

In yet another embodiment, the gaseous waste stream fed to the diffusion tower 106 is heated to a temperature of about 50 to about 100° C. In an exemplary embodiment, the gaseous waste stream has a temperature of about 70° C. to about 95° C., specifically about 75 to about 93° C., and more specifically about 80 to about 90° C.

In one embodiment, the gaseous waste stream entering the diffusion tower 106 has a relative humidity of less than or equal to about 70%, specifically less than or equal to about 60%, specifically less than or equal to about 50%, specifically less than or equal to about 40%, and more specifically less than or equal to about 30%. In an exemplary embodiment, the gaseous waste stream leaving the diffusion tower 106 has a relative humidity of about greater than or equal to about 80%, specifically greater than or equal to about 85%, specifically greater than or equal to about 90%, specifically greater than or equal to about 95%, and more specifically about 100%.

The sulfur dioxide content in the gaseous waste stream leaving the diffusion tower is up to about 55 volume percent (vol %) less, specifically up to about 65 vol % less, specifically up to about 75 vol % less, specifically up to about 85 vol % less, and more specifically up to about 95 vol % less than the sulfur dioxide content in the gaseous waste stream that enters the diffusion tower.

With reference now again to the FIG. 1, the humidified gaseous waste stream (without a portion of the sulfur dioxide) leaving the diffusion tower 106 is fed into the direct contact condenser 110. In one embodiment, a forced draft blower (not shown) can be used to draw the gaseous waste stream into the direct contact condenser 110 from the diffusion tower 106. In the direct contact condenser 110, the water vapor is condensed into fresh water that is collected in the collection tank 116 of the direct contact condenser 110. It may be possible to use types of condensers other than the direct contact type. However, direct contact type heat exchangers provide large heat transfer areas and yield the highest heat transfer efficiency of the available condenser types when operating in the presence of non-condensable gases, such as air.

In one embodiment, the fresh water used in the direct contact condenser 110 to condense the humidified gaseous waste stream may be obtained from a municipal water supply and may be fed only once through the direct contact condenser 110. When the fresh water is fed once through the direct contact condenser 110, a collection tank 110 and the second heat exchanger 114 are not used. After condensing the moisture in the humidified gaseous waste stream, the fresh (purified) water that now includes the condensate, can be discharged from the direct contact condenser for useful purposes such as drinking, irrigation, and the like. In another embodiment, as described above, the fresh water can be recycled via the collection tank 116 and the second heat exchanger 114.

The method described above for extracting the sulfur dioxide is advantageous because it combines gas cleaning with at least one other beneficial use, the production of fresh water, and potentially another beneficial use, the processing of a wastewater stream. When the feed water is seawater, the resulting desalination process can operate with reduced cost with respect to other desalination processes because the process described here has the benefit of removing sulfur dioxide. In addition, the method facilitates both the recovery of energy as well as the recovery of sulfur dioxide from the gaseous waste stream. The recovery of water in this process can advantageously defray the cost of scrubbing the sulfur dioxide from the feed stream. When the feed water is, for example, a wastewater stream that would otherwise require disposal, use of the presently described process has, in addition to the synergistic benefits described above, the additional benefit of concentrating the wastewater, reducing the volume that will require additional treatment or disposal.

The method and apparatus for the removal of sulfur dioxide from the gaseous waste stream is now demonstrated by the following non-limiting examples. The examples are provided for illustrative purposes only and are not to be construed as limiting the scope or content of the invention in any way.

EXAMPLE

In order to explore the performance and parametric bounds of an exemplary diffusion driven desalination process, a thermodynamic cycle analysis has been performed by considering a system similar to system 100 in the FIG. 1. In performing the analysis, the following assumptions were made.

1. The process operates at steady state conditions.
2. There are no energy losses to the environment from the heat and mass transfer equipment.
3. Air and water vapor may be treated as a perfect gas.
4. Changes in kinetic and potential energy are relatively small.

The following nomenclature is used in this detailed description.

A Cross sectional area of the diffusion tower (m$^2$)
$a_w$ Wetted specific area (m$^2$/m$^3$)
a Total specific area of the packing (total surface area of packing per unit volume of space occupied) (m$^2$/m$^3$)
$C_P$ Specific heat of vapor, (kJ/kg·K)
$CO_2$ Carbon dioxide
d Diameter of the diffusion tower, assuming circular cross section (m)
$d_p$ Diameter of the packing material (m)
D Molecular diffusion coefficient (m$^2$/s)
G Gas flux $\dot{m}_a/A$, (kg/(s m$^2$))
h Enthalpy (kJ/kg)
$h_{fg,V}$ Latent heat of evaporation of water (kJ/kg)
$k_{SO_2}$ Mass transfer coefficient for $SO_2$ (m/s)
$K_{SO_2}$ Overall mass transfer coefficient for $SO_2$ (m/s)
$k_{CO_2}$ Mass transfer coefficient for $CO_2$ (m/s)
$K_{CO_2}$ Overall mass transfer coefficient for $CO_2$ (m/s)
$K_G$ Mass transfer coefficient on gas side for water vapor (m/s)
$K_t$ Thermal conductivity (W/m·K)
L Liquid flux $\dot{m}_L/A$ (kg/(s m$^2$))
g Acceleration due to gravity (m/s$^2$)
M Molecular weight (kg/kmol)
n number of moles (kmol)
P Total absolute pressure (Pa)
$P_V$ Partial pressure of water vapor in gas (Pa)
$P_{SO_2}$ Partial pressure of $SO_2$ in gas (Pa)
$P_{CO_2}$ Partial pressure of $CO_2$ in gas (Pa)
$q_{HL}''$ Heat loss from the diffusion tower to the atmosphere (kW/m$^2$)
$\bar{R}$ Universal gas constant ($\bar{R}$=8.314 kJ/(kmol K))
$SO_2$ Sulfur dioxide
T Temperature (K)
U Overall heat transfer coefficient (kW/m$^2$ K)
y Mole fraction (no units)
z Height of the tower from bottom to top (m)
Greek symbols
α $CO_2$ mass flow rate ratio ($\alpha = \dot{m}_{CO_2}/\dot{m}_a$)
β $SO_2$ mass flow rate ratio ($\beta = \dot{m}_{SO_2}/\dot{m}_a$)
X Concentration in ppm of either $SO_2$ or $CO_2$
ρ Density (kg/m$^3$)
$\bar{\rho}_{SO_2,G}$ Average concentration of $SO_2$ in bulk gas (kg/m$^3$)
$\bar{\rho}_{CO_2,G}$ Average concentration of $CO_2$ in bulk gas (kg/m$^3$)
$\rho_{SO_2,G}^*$ Concentration of $SO_2$ on gas side in equilibrium with liquid concentration (kg/m$^3$)
$\rho_{CO_2,G}^*$ Concentration of $CO_2$ on gas side in equilibrium with liquid concentration (kg/m$^3$)
$\rho_{SO_2,L}^*$ Concentration of $SO_2$ on liquid side in equilibrium with gas concentration of $SO_2$ (kg/m$^3$) obtained by Henry's law
$\rho_{CO_2,L}^*$ Concentration of $CO_2$ on liquid side in equilibrium with gas concentration of $CO_2$ (kg/m$^3$) obtained by Henry's law
$\bar{\rho}_{SO_2,L}$ Average concentration of $SO_2$ in bulk liquid (kg/m$^3$)
$\bar{\rho}_{CO_2,L}$ Average concentration of $CO_2$ in bulk liquid (kg/m$^3$)
ω Absolute humidity ratio ($\omega = \dot{m}_V/\dot{m}_a$) (kg$_V$/kg$_a$)
Φ Relative humidity ($\Phi = P_V/P_{sat}$)
$\kappa_{SO_2}$ Henry's constant (no units)
$\kappa_{CO_2}$ Henry's constant (no units)
Ψ Enhancement factor
μ Dynamic viscosity (Pa·sec)
Subscripts
a Gaseous phase
Abs Absorbed
Bulk Bulk phase
Evap Water evaporated from liquid to gas
G Gas phase
i Gas Liquid interface
in Inlet
L Liquid phase
mix Mixture of gases
out Outlet
sat Saturated condition
tower Diffusion tower
V Vapor In modeling the system, the following equations (XIII)-(XVII) were used.

$$\frac{d\omega}{dz} = \frac{K_G a_w}{G} \frac{M_V}{\bar{R}} \left[ \frac{\frac{P_{sat}(T_i)}{T_i} - \frac{(\omega)}{(0.622+\omega)}\frac{P}{T_a}}{\left\{1 - \frac{\left(\frac{\beta}{\beta+3.556\omega+2.211+1.4556\alpha}\right)-}{\left(\frac{\alpha}{\alpha+2.443\omega+1.519+0.687\beta}\right)}\right\}} \right] \quad (XIII)$$

$$-\frac{d\beta}{dz} = \frac{K_{SO_2,G} a_w}{G}\left(1 - \kappa_{SO_2}\frac{\bar{\rho}_{SO_2,L}}{\bar{\rho}_{SO_2,G}}\right) \quad (XIV)$$

$$\frac{M_{SO_2}}{\bar{R}}\frac{P}{T_a}\frac{\beta}{(\beta+3.556\omega+1.4556\alpha+2.211)}$$

$$-\frac{d\alpha}{dz} = \frac{k_{CO_2,L} a_w \Psi_{CO_2}}{G}\left(\frac{1}{\kappa_{CO_2}} - \frac{\bar{\rho}_{CO_2,L}}{\bar{\rho}_{CO_2,G}}\right) \quad (XV)$$

$$\frac{M_{CO_2}}{\bar{R}}\frac{P}{T_a}\frac{\alpha}{(\alpha+2.443\omega+0.687\beta+1.519)}$$

$$\frac{dT_L}{dz} = \quad (XVI)$$
$$\left(\frac{G}{L}\right)\frac{d\omega}{dz}\left(\frac{h_{fg,V}(T_i)-h_L}{C_{PL}}\right) + \left(\frac{G}{L}\right)\left(\frac{h_{fg,SO_2}(T_i)-h_{SO_2,L}}{C_{PL}}\right)\frac{d\beta}{dz} +$$
$$\left(\frac{G}{L}\right)\left(\frac{h_{fg,CO_2}(T_i)-h_{CO_2,L}}{C_{PL}}\right)\frac{d\alpha}{dz} - \left(\frac{Ua(T_a-T_L)}{LC_{PL}}\right)$$

$$\frac{dT_a}{dz} = \frac{[h_{fg,V}(T_i)-h_V(T_a)]}{C_{pmix}(1+\alpha+\omega+\beta)}\frac{d\omega}{dz} + \quad (XVII)$$
$$\frac{[h_{fg,SO_2}(T_i)-h_{SO_2}(T_a)]}{C_{pmix}(1+\alpha+\omega+\beta)}\frac{d\beta}{dz} + \frac{[h_{fg,CO_2}(T_i)-h_{CO_2}(T_a)]}{C_{pmix}(1+\alpha+\omega+\beta)}\frac{d\alpha}{dz} -$$
$$\frac{Ua(T_a-T_L)}{G(1+\alpha+\beta+\omega)C_{pmix}} - \frac{4q_{HL}''}{Gd(1+\alpha+\beta+\omega)C_{pmix}}$$

These coupled first order ordinary differential equations are simultaneously solved in order to yield the variation of the following variables throughout the diffusion tower: the humidity ratio, ω, the $SO_2$ mass flow ratio, β, the $CO_2$ mass flow ratio, α, the liquid temperature, $T_L$, and the air/vapor/gas temperature, $T_a$. Once these sets of equations are solved and the variables are determined, the system performance can be predicted.

Description of Experimental Set-Up

Figure 3:
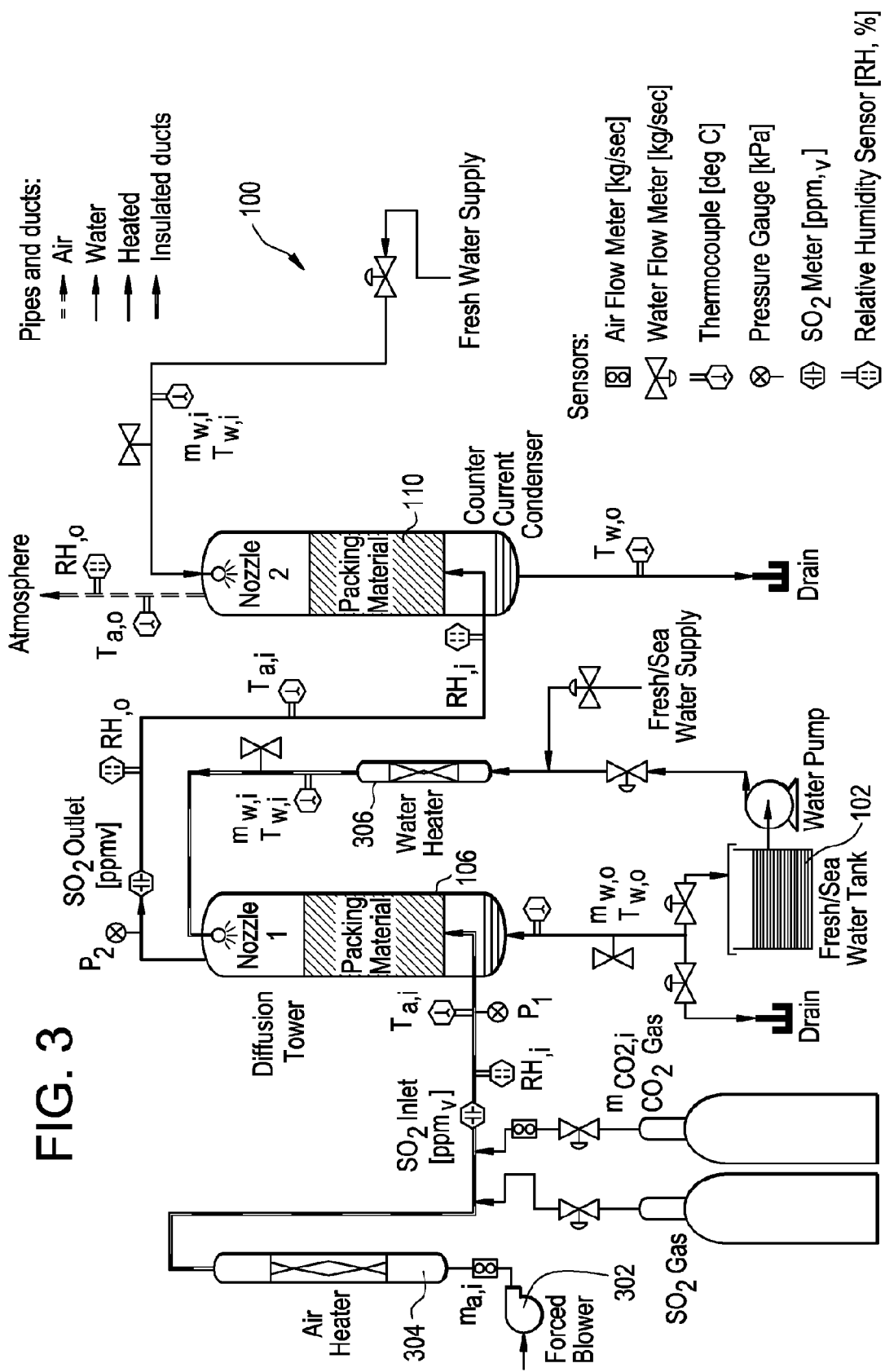
FIG. 3 is a schematic diagram of the desalination apparatus that was used to conduct the Examples.

These examples were conducted to demonstrate that the diffusion driven desalination apparatus could be used to desalinate water while simultaneously performing $SO_2$ scrubbing from a gaseous waste stream. FIG. 3 is a schematic diagram of the laboratory scale diffusion driven desalination facility constructed in the multiphase flow and boiling heat transfer laboratory at the University of Florida.

This apparatus is centered on two components, namely the diffusion tower and the direct contact condenser. In order to operate the diffusion driven desalination facility and acquire useful data, a host of other components were added, such as water tanks, a recirculating pump, and instrumentation. This section describes each element of the diffusion driven desalination facility and its operation.

System Overview

With reference to the FIG. 3, the fresh water supply to the facility draws water from either a municipal water line or a water supply tank 102. For purposes of this example, either fresh water or sea water can be used in the water supply tank 102.

This design allows the diffusion driven desalination facility to operate in both a once-through mode or in a recirculation mode. For the once-through mode, fresh water and feed water is supplied from the municipal lines only. For the recirculation mode, the feed water originates from the water storage tank 102 and is recirculated to the water storage tank 102 as depicted in the FIG. 3.

The feed water from either the municipal source or the water storage tank 102 is initially passed through a vane type flow meter and then enters a pre-heater that is capable of raising the feed water temperature to 50° C. The feed water then flows through the main heater, which can raise the temperature to 100° C., the temperature is measured at the outlet of the main heater. The feed water temperature is controlled with a proportional integral derivative (PID) feedback temperature controller. The feed water is then fed to the top of the diffusion tower where it is sprayed over the top of the packing material and gravitates downwards. The portion of the water that is not evaporated is collected at the bottom of the diffusion tower 106 and is either stored in the water storage tank 102 for recirculation or discharged through the drain when the system is operated in the once-through operation. The exit water temperature from the diffusion tower 106 is measured using a type E ungrounded thermocouple.

Dry air is drawn into a centrifugal blower 302 equipped with a 3.68 kW (5.0 horsepower) motor. The discharge air from the blower 302 flows through a 10.2 cm inner diameter PVC duct in which a thermal air flow meter is inserted. The air flow rate is controlled by varying the speed of the blower. The air then flows through a section where it is heated by two 7 kW tubular heaters. These heaters are placed in a steel pipe which is connected to the PVC pipes via flanges. The desired quantities of sulfur dioxide ($SO_2$) and carbon dioxide ($CO_2$) gases are injected into the air stream after the heating section through two different inlet ports. The combination of the air from the centrifugal blower together with the sulfur dioxide and carbon dioxide tanks shown in the FIG. 3 form the gaseous waste stream described above.

The air relative humidity, temperature and sulfur dioxide ($SO_2$) inlet concentration are measured with a resistance type humidity sensor and a TSI $SO_2$ electro-chemical sensor respectively. The $SO_2$ is supplied to the diffusion driven desalination facility from a 100% pure $SO_2$ pressurized cylinder. A cylinder containing a 30% $CO_2$/70% air mixture is also connected to the facility to supply $CO_2$. The velocity of the flow from this cylinder is measured with a hot wire anemometer. The mass flow rate from the $CO_2$/Air mixture cylinder is then calculated using the flow velocity. The $SO_2$ and $CO_2$/air mixture cylinders are provided with regulators to control the flow. The air/$SO_2$/($CO_2$/air) mixture enters the diffusion tower and is forced through the packed bed. A magnetic reluctance differential pressure transducer is used to measure the pressure drop across the height of the packing material. The air exits the diffusion tower 106 where the relative humidity, temperature and SO2 concentration of the exit air are measured. The air then enters a direct contact condenser 110.

The direct contact condenser tower operates in a countercurrent flow mode. Fresh water is drawn from a municipal water line and is then sprayed on the top of the tower. The flow rate in a municipal water line is measured with a turbine flow meter. The water temperature is measured at the top of the direct contact condenser tower.

The air leaving the diffusion tower 106 is at an elevated temperature and humidity. The air enters the direct contact condenser 110 where it flows upwards in a direction that is opposed to the direction of the falling water. Upon contacting the falling water, the air is dehumidified and cooled. The exit air temperature and the humidity from the direct contact condenser 110 are measured with a humidity sensor. The air then exits via a duct at the top of the direct contact condenser 110. The water used to cool the air in the direct contact condenser and the condensate product from the air then flows down the direct contact condenser tower to a drain where the exit water temperature is measured with a thermocouple.

Diffusion Tower

The diffusion tower 106, previously depicted in FIG. 2, is comprised of three primary sections: the top, middle, and bottom. The top contains the water spray and exit air duct, the middle houses the packing, and the bottom comprises an air distributor and a drain. The top and bottom sections are constructed from schedule 40 25.4 cm (10 inch nominal) inner diameter polyvinyl chloride (PVC) pipe and the main body is constructed from 24.1 centimeter (cm) acrylic ID tubing with wall thickness 0.64 cm. The three sections are connected via PVC bolted flanges. The transparent main body accommodates up to 1 meter of packing material along its height. The external surface of the diffusion tower 106 is insulated with a high temperature fiber-glass insulating material to prevent heat loss to the atmosphere.

The top section of the diffusion tower 106 is fitted with a high efficiency cellular mist eliminator to prevent aerosolized water from being carried over to the condenser with air. The mist eliminator supplied by Brentwood industries, is made up of a ultraviolet (UV) protected PVC material and carries the trade name CDX-80®.

Direct Contact Condenser

The direct contact condenser 110 is a single stage countercurrent flow type constructed from a 27 cm outer diameter, 0.64 cm thick R-cast acrylic tube. The bottom portion contains two schedule 80°-90° 25.4 cm PVC elbows connected using a PVC pipe. This condenser is connected to the diffusion tower via a flexi-duct.

Water Distribution Systems

The two water distributors used in the diffusion tower 106 and the direct contact condenser 110 are manufactured by Allspray. They are brass full cone nozzles having a 65° spray angle and are designed for a uniform solid cone spray. The feed water and the fresh water are introduced into the diffusion tower 106 and the direct contact condenser 110 respectively via the solid cone sprays. The two spray nozzles are designed to allow a water capacity of $2.5 \times 10^{-4}$ cubic meters per second ($m^3/s$). The nozzles are placed at a sufficient height from the packing material of both the diffusion tower 106 and the direct contact condenser 110 to ensure that spray covers the entire packing area.

Water Heaters

The main water heater 306 consists of two 3 kW electric heaters wrapped around a copper pipe through which the feed water flows. The power to the heaters is controlled with two PID feedback temperature controllers with a 240 V output. The feedback temperature to the controllers is supplied with a type J thermocouple inserted into the feed water flow at the discharge of the heater.

Air Heater

Two 7.5 kilowatt (kW), 1.21 cm diameter round cross sectional tubular air heaters form the air heater 304 that is used to heat the air. The air heaters each have a 240 volt (V) rating and a watt density of 62 kilowatt per square meters ($kW/m^2$). The sheath is Incoloy, which has a maximum temperature of 815° C. It has a sheath length of 254 cm and a heated length of 236 cm. The sheath protects the electrical portion of the heating element from exposure to the ambient. The air heaters have been shaped to fit inside a 10 cm nominal diameter steel pipe.

Packing Material

The packing material used for the diffusion tower and condenser is polypropylene HD Q-PAC®, and was specially cut using a hotwire so that it fits tightly into the main body of the diffusion tower and the condenser. The specific area of the packing is 267 square meter per cubic meter ($m^2/m^3$) and its effective diameter for modeling purposes is 17 millimeters (mm).

Water Tanks

Water is supplied to and collected from the diffusion tower using two heavy duty water storage tanks, each having a capacity of 115 gallons. The tanks are manufactured by Snyder Industries, Inc. The water storage tanks, the water pump, the municipal water supply line and the water drain line are in fluid communication with one another using PVC piping. This piping system enables the diffusion driven desalination facility to be run in different configuration modes such as the once through mode and the recirculation mode. For experimental tests where the sea water is the feed water to the diffusion tower 106, the artificial sea water was initially prepared before the experimental testing and stored in the water tanks. The artificial sea water was prepared according to the standard procedures given in "ASTM International Designation: D 1141-98 (Reapproved 1993)".

Instrumentation

The instrumentation layout is shown in FIG. 3. The vane-type water flow-meter, constructed by Erdco Corporation, has a range of $2.5 \times 10^{-5}$ to $2.52 \times 10^{-4}$ cubic meters per second ($m^3/sec$). It has been calibrated using the catch and weigh method. The flow-meter has a 4 to 20 milli amperes (mA) output that is proportional to the flow rate and has an uncertainty of $\pm 2.21 \times 10^{-2}$ kilograms per square meter-second ($kg/m^2$-s) for the water inlet mass flux. The turbine water flow-meters, constructed by Proteus Industries Inc., have a range of $2.5 \times 10^{-5}$ to $2.0 \times 10^{-4}$ cubic meter per second ($m^3/s$). They were also calibrated using the catch and weigh method. These flow-meters have a 0 to 20 mA or 0 to 5 V output that is proportional to the flow rate, and the measurement uncertainty is $\pm 3.45 \times 10^{-2}$ $kg/m^2$-s for the water inlet mass flux. The air flow rate is measured with a model 620S smart insertion thermal air flow-meter. The flow-meter has a response time of 200 ms with changes in air mass flow rate. The air flow-meter has a microprocessor-based transmitter that provides a 0 to 10 V output signal. The air flow-meter electronics are mounted in a NEMA 4x housing. The meter range is 0 to 0.5 $m^3/s$ of air. The measurement uncertainty is $\pm 5.92 \times 10^{-3}$ $kg/m^2$-s for the air inlet mass flux at 101.3 kPa, 20° C., and 0% relative humidity.

The relative humidity is measured with duct-mounted HMD70Y resistance-type humidity and temperature transmitters manufactured by Vaisala Corp. Four sensors are installed in the facility. The humidity and temperature transmitters have a 0 to 10 V output signal and have been factory calibrated. The measurement uncertainty is $\pm 1.185 \times 10^{-3}$ $kg_v/kg_a$ for the absolute humidity. The $SO_2$ concentration is measured with a TSI CA-6050 electro-chemical sensor. Each sensor is supplied with a sampling probe, consisting of stainless steel sampling tube, plastic handle, and non-reactive plastic sample line with a water stop filter. The sampling probe is capable of drawing the gas sample at a rate of $1.34 \times 10^{-5}$ $m^3/s$ from the sampling point to the electro-chemical sensor in the instrument. The sample flow is provided by an internal diaphragm vacuum pump. The model CA-6050 has the measurement range of 0 to 4000 ppm by volume of $SO_2$. The measurement uncertainty is $\pm 5$ ppm with a resolution of 1 ppm.

$CO_2$ is supplied to the airstream of the diffusion driven desalination facility from a cylinder containing a mixture of 30% $CO_2$ and 70% air. It should be noted that the 10% $CO_2$ in the air stream of the diffusion tower is obtained by mixing a predetermined amount of air from the blower with a predetermined amount of 30% $CO_2$ mixture from the $CO_2$ cylinder. The flow rate from the $CO_2$ cylinder is measured using a heavy duty thermo-anemometer. This anemometer is manufactured by Extech Instruments. It is provided with a telescoping probe and is capable of simultaneously displaying velocity and temperature. The range of the anemometer is 0.20 to 20 m/s. The accuracy of the measurement is $\pm 1\%$ Full Scale (FS) with a resolution of 0.1 m/s.

All temperature measurements used in the thermal analysis are measured with type-E thermocouples with an estimated uncertainty of $\pm 0.2°$ C. The pressures at the inlet and exit of the diffusion tower are measured with two Validyne P2 static pressure transducers. All of the wetted parts are constructed with stainless steel. The transducers have an operating range of 0 to 0.34 atmospheres (atm) (0 to 5 pounds per square inch (psi)) and have a 0 to 5 V proportional output. The transducers have an uncertainty of 0.25% of full scale. They are shock resistant and operate in environments ranging in temperature from −20° to 80° C.

The pressure drop across the test section is measured with a DP15 magnetic reluctance differential pressure transducer. The pressure transducer signal is conditioned with a Validyne carrier demodulator. The carrier demodulator produces a 0 to 10 V DC output signal that is proportional to the differential pressure. The measurement uncertainty is ±0.25% of full scale.

During operation of the diffusion driven desalination facility, the total dissolved solids (TDS) and pH are measured using a conductivity/TDS probe and pH meter. The conductivity/TDS meter uses a carbon rod electrode using separated probe for measurement. The conductivity/TDS meter has a built in automatic temperature compensation circuit that is adjustable between 0 to 5% per degree Celsius. The conductivity measurement has two ranges: 2 milliSiemens (mS) and 20 mS. The resolution for 2 mS range is 0.001 mS with an uncertainty of 3% full scale. The 20 mS has a resolution of 0.01 mS with 3% FS uncertainty. The TDS has two ranges: 2000 ppm and 20000 ppm. For the 2000 ppm range, the resolution is 1 ppm. The resolution of the 20000 ppm range is 10 ppm. The temperature measurement range is from 0 to 60° C. The pH measurement covers the full range of 0 to 14, with a resolution of 0.01 pH. The uncertainty is ±0.02 pH.

A digital data acquisition system has been developed for measuring instrumentation signal outputs. The data acquisition system, manufactured by Computer Boards consists of a 16-bit analog to digital converter and a multiplexer card with programmable gain calibrated for type E thermocouples and 0 to 10V input ranges. A software package, SoftWIRE, which operates in conjunction with Microsoft Visual Basic, allows a user defined graphical interface to be specified specifically for the experiment.

The experimental data acquisition system is designed using the Virtual Instrumentation module. The "Main" panel has a switch button to begin or stop the data acquisition program. Once the program begins, the experimental data will be recorded in a database file. Also, all of the experimental measurements are displayed here in real time.

Example 1

In this example, fresh municipal water and artificially prepared sea water were used separately in different tests in the operation of the diffusion driven desalination facility. For tests with fresh water as the feed water to the diffusion tower, it was supplied directly from the municipal supply line, as shown in the FIG. 3. For the tests with sea water as the feed water to the diffusion tower, the sea water was initially prepared and stored in the storage tanks and later was pumped to the top of the diffusion tower, as also shown in the FIG. 3. It should be noted that in both the cases (i.e., when fresh water or sea water was used in the diffusion tower) only the fresh water from the municipal supply line was used in the condenser. The test runs were conducted to demonstrate the potential of the diffusion drive desalination process to produce fresh water and scrub $SO_2$ from air.

The test runs were also conducted to validate the thermal transport model by comparing the measured data such as the exit air and water temperatures, exit air humidity and exit air SO2 concentrations, with those calculated using the model and to experimentally examine the influence of 10% $CO_2$ in air on the $SO_2$ scrubbing efficiency of the diffusion drive desalination facility.

These tests were conducted for a wide range of values of air inlet $SO_2$ concentrations and the ratio of feed water to gaseous waste stream mass flow rates of the diffusion tower. The air inlet temperature to the diffusion tower was kept around 90° C., since this is the approximate temperature of the discharge off-gas at aluminum smelting plants. The inlet temperature of the feed water is kept around 40° C. for almost all the tests. The inlet concentration of $SO_2$ in the air was varied from 0 to 100 ppm. The ratio of the mass flow rate of water to the air mass flow rate for the diffusion tower was varied from 0.5 to 1.8.

In these experiments, $SO_2$ is supplied to the diffusion driven desalination facility through an injection system from a 100% $SO_2$ pressurized cylinder as shown in the FIG. 3. Initially it is injected into an elbow PVC pipe joint, which is connected to a straight PVC pipe, in turn, connected to the bottom of the diffusion tower. There are two $SO_2$ sensors connected to the diffusion driven desalination facility. The first sensor is connected just at the bottom of the diffusion tower and the second one is connected at the top of the diffusion tower. The first $SO_2$ sensor is located 10 pipe diameter downstream from the $SO_2$ injection point. Due to the difference in the density between $SO_2$ and air, there is some uncertainty as to whether the air and $SO_2$ are fully mixed prior to reaching the inlet $SO_2$ sensor.

A small experimental test was conducted on the diffusion driven desalination facility to ascertain the fidelity of the measurement of $SO_2$ concentration during the experiments. In this test the air flow to the diffusion tower was set to 0.052 kg/sec and the air temperature was elevated to 90° C. There was no water circulation in the diffusion tower of the DDD facility. With only air flowing, $SO_2$ was injected into the air line and its concentration was measured at the inlet to the diffusion tower and exit of the diffusion tower at the same points as was done for prior experiments. Three concentrations were considered 25, 105, and 205 ppm. The results are shown in the Table 2 below.

TABLE 2

Measured $SO_2$ Concentration

| Inlet $SO_2$ ppm | Outlet $SO_2$ ppm | Difference |
|---|---|---|
| 25 | 25 | 0 |
| 105 | 110 | 5 |
| 205 | 214 | 9 |

$\dot{m}_a$ = 0.052 kg/sec, $\dot{m}_w$ = 0.0 kg/sec, $T_{a,i}$ = 90° C.

As is observed, the agreement at low concentration is very good. As the concentration increases the discrepancy increases. For the majority of the experimental tests reported above, the inlet concentration was 105 ppm or below, and for such conditions the maximum uncertainty is ±5 ppm due the inadequate mixing of the $SO_2$ and air. Keep in mind that there is also a ±5 ppm uncertainty associated with the $SO_2$ sensor used for the measurement. The discrepancy between the measured and the predicted $SO_2$ change for the scrubbing tests is on the order of ±4 ppm for most of the measurements. Therefore, for the experimental conditions listed in tables below, the measured change in $SO_2$ concentration is within ±5 ppm uncertainty.

The results for the once through conditions are shown in the Tables 3 and 4 below.

TABLE 3

| Exp. with the fresh water in the tower | Inlet Conditions | Exit Conditions | Predicted Exit Conditions |
|---|---|---|---|
| Experiment #1 | | | |
| G = 1.10 kg/sec · m² | | | |
| $L_{Tower}$ = 1.20 kg/sec · m² | | | |
| $L_{Cond}$ = 1.20 kg/sec · m² | | | |
| Tower | | | |
| Air Temp. ($T_a$ ° C.) | 90.9 | 38.7 | 36.1 |
| Water Temp. ($T_w$ ° C.) | 41.0 | 35.5 | 35.0 |
| Humidity Ratio (ω $kg_v/kg_a$) | 0.01 | 0.041 | 0.04 |
| $SO_2$ (X ppm) | 78 | 16 | 17 |
| Condenser | | | |
| Air Temp. ($T_a$ ° C.) | 37.0 | 35.2 | 33.3 |
| Fresh Water Temp. ($T_w$ ° C.) | 28.9 | 35.5 | 34.1 |
| Humidity Ratio (ω $kg_v/kg_a$) | 0.041 | 0.037 | 0.032 |
| Overall Results | | | |
| $m_w/m_a$ = 1.1 | | | |
| $\eta_{cw}$ = 0.4% | | | |
| $\eta_{SO2}$ = 79.6% | | | |
| Sample #2 | | | |
| G = 1.10 kg/sec · m² | | | |
| $L_{Tower}$ = 1.20 kg/sec · m² | | | |
| $L_{Cond}$ = 1.20 kg/sec · m² | | | |

TABLE 3-continued

| Exp. with the fresh water in the tower | Inlet Conditions | Exit Conditions | Predicted Exit Conditions |
|---|---|---|---|
| Tower | | | |
| Air Temp. ($T_a$ ° C.) | 90.7 | 38.8 | 36.1 |
| Water Temp. ($T_w$ ° C.) | 41.1 | 35.3 | 35.2 |
| Humidity Ratio ($\omega$ $kg_v/kg_a$) | 0.01 | 0.041 | 0.04 |
| $SO_2$ (X ppm) | 106 | 19 | 21 |
| Condenser | | | |
| Air Temp. ($T_a$ ° C.) | 37.4 | 35.4 | 32.3 |
| Fresh Water Temp. ($T_w$ ° C.) | 29.1 | 35.7 | 32.1 |
| Humidity Ratio ($\omega$ $kg_v/kg_a$) | 0.041 | 0.037 | 0.029 |
| Overall Results | | | |
| $m_w/m_a$ = 1.0 | | | |
| $\eta_{cw}$ = 0.4% | | | |
| $\eta_{SO2}$ = 82.2% | | | |

TABLE 4

| Exp. with Fresh Water in Tower | Inlet Conditions | Exit Conditions | Predicted Exit Conditions |
|---|---|---|---|
| Experiment #3 G = 1.20 kg/sec · m² $L_{Tower}$ = 1.20 kg/sec · m² $L_{Cond}$ = 1.20 kg/sec · m² | | | |
| Tower | | | |
| Air Temp. ($T_a$ ° C.) | 101.5 | 39.2 | 36.2 |
| Water Temp. ($T_w$ ° C.) | 40.3 | 36.0 | 36.8 |
| Humidity Ratio ($\omega$ $kg_v/kg_a$) | 0.01 | 0.040 | 0.040 |
| $SO_2$ (X ppm) | 77 | 17 | 16 |
| Condenser | | | |
| Air Temp. ($T_a$ ° C.) | 37.8 | 35.6 | 34.0 |
| Fresh Water Temp. ($T_w$ ° C.) | 29.1 | 36.4 | 34.5 |
| Humidity Ratio ($\omega$ $kg_v/kg_a$) | 0.040 | 0.038 | 0.031 |
| Overall Results | | | |
| $m_w/m_a$ = 1.0 | | | |
| $\eta_{cw}$ = 0.2% | | | |
| $\eta_{SO2}$ = 78.1% | | | |
| Experiment #4 G = 1.20 kg/sec · m² $L_{Tower}$ = 1.20 kg/sec · m² $L_{Cond}$ = 1.20 kg/sec · m² | | | |
| Tower | | | |
| Air Temp. ($T_a$ ° C.) | 101.9 | 39.2 | 36.2 |
| Water Temp. ($T_w$ ° C.) | 40.7 | 36.2 | 37.2 |
| Humidity Ratio ($\omega$ $kg_v/kg_a$) | 0.01 | 0.040 | 0.04 |
| $SO_2$ (X ppm) | 108 | 23 | 22 |
| Condenser | | | |
| Air Temp. ($T_a$ ° C.) | 37.8 | 35.6 | 34.0 |
| Fresh Water Temp. ($T_w$ ° C.) | 29.2 | 36.7 | 34.5 |
| Humidity Ratio ($\omega$ $kg_v/kg_a$) | 0.040 | 0.038 | 0.032 |
| Overall Results | | | |
| $m_w/m_a$ = 1.1 | | | |
| $\eta_{cw}$ = 0.2% | | | |
| $\eta_{SO2}$ = 78.9% | | | |

As can be seen from the Tables 3 and 4, there is a good correlation between the calculated and the measured values. In addition, it can be seen that about 75 to about 85 weight percent of the sulfur dioxide in the gaseous waste stream can be removed using diffusion drive desalination.

Example 2

This example was conducted in the recirculation mode. In this example, the feed water was supplied to the diffusion tower of the FIG. 3 from the water storage tank. The portion of water that is not evaporated in the diffusion tower is collected at the bottom of the diffusion tower and is returned back to the storage tanks. The details of the experimental results are given below. The tests were conducted using both the fresh water from the municipal line and the artificially prepared sea water.

Fresh Water Tests

The total time duration of a typical experiment was three (3) hours. For these experiments, the mass flow rate of air and water were kept at approximately 0.033 kg/sec and 0.105 kg/sec, respectively, throughout the experiment. These mass flow rates were selected to obtain a high water to air mass flow ratio of approximately 3.2. The inlet temperature of air to the diffusion tower was kept constant at approximately 90° C. At the beginning of the experiment, the water inlet temperature to the diffusion tower was kept at 45° C. However, as expected the water temperature in the storage tanks slowly increased to 56° C. by the end of the experiment. This increase was primarily due to the mixing of the hot water coming out of the diffusion tower with the water in the storage tanks. The air $SO_2$ concentration going into the diffusion tower was kept at approximately 25 ppm during the course of the experiment. This low $SO_2$ concentration together with the high water to air mass flow ratio in the tower ensured complete $SO_2$ scrubbing in the diffusion tower.

The system data were measured at regular intervals during the experiment. Water samples from the condenser and the storage tank were also collected during the course of the experiment and the values of conductivity and pH were measured. These samples were stored and later sent to Flowers Chemical Laboratories (FCL) a commercial laboratory in Altamonte Springs Fla., for determining TDS, pH and sulfate ($SO_4^{2-}$) concentration. FCL determined these values by industry standard methods; unfortunately these FCL measurements have a large uncertainty. In addition before the start of the experiment the values of TDS and pH of the water in the storage tanks were measured and water samples were collected and sent to FCL for additional analysis.

Figure 4:
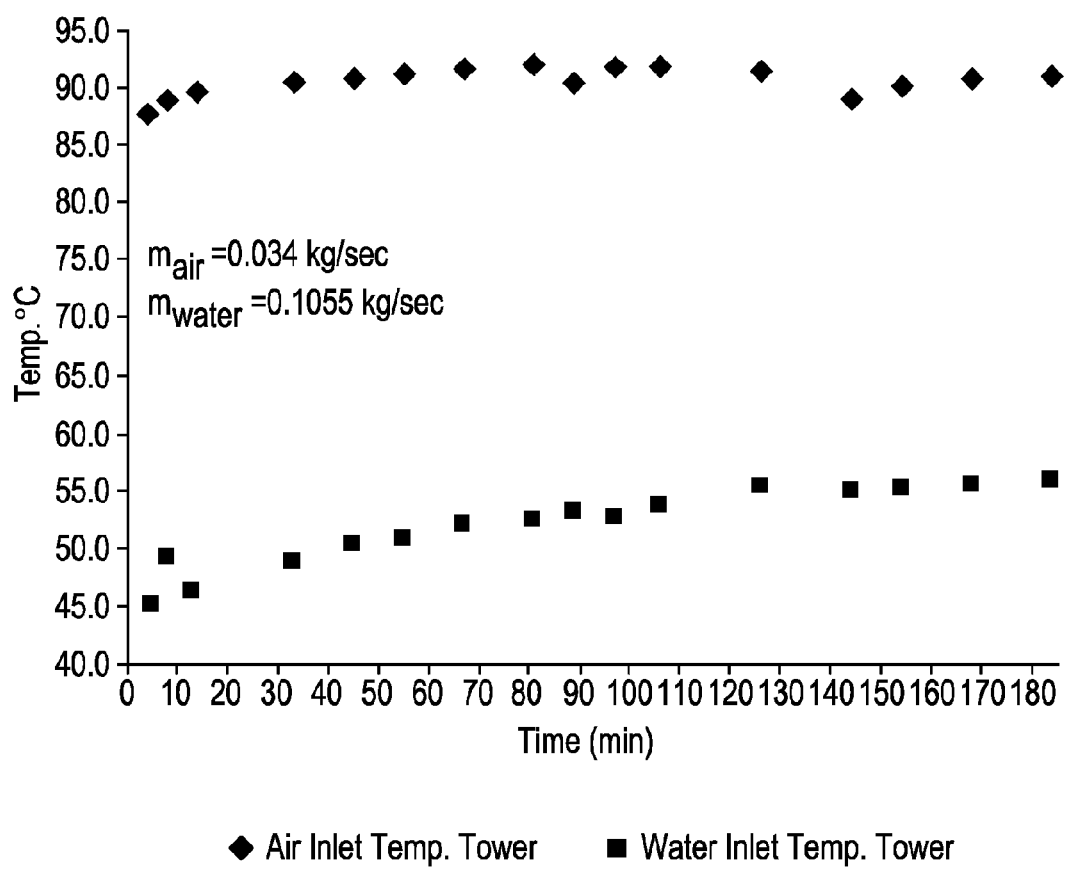
FIG. 4 is a graph that shows the variation of the diffusion tower inlet air temperature and water temperature versus time.
Figure 5:
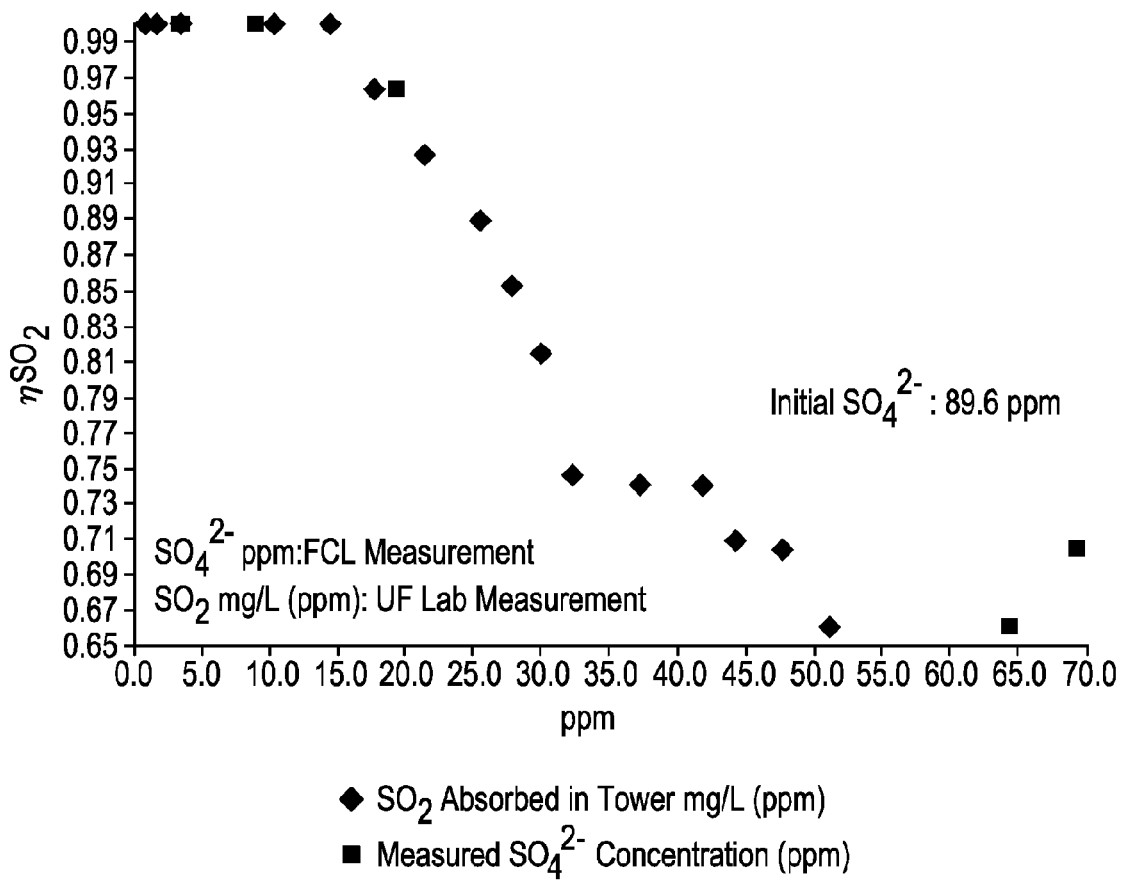
FIG. 5 is a graph that shows the variation of sulfur dioxide scrubbing efficiency ($\eta_{SO2}$) and the parts per million of sulfur dioxide absorbed in the tower and the increase in sulfate ($SO_4^{2-}$) values in the storage tank water.

FIG. 4 shows the variation of the diffusion tower inlet air temperature and water temperature versus time. FIG. 5 shows the variation of $SO_2$ scrubbing efficiency ($\eta_{SO2}$) and the ppm of $SO_2$ absorbed in the tower and the increase in sulfate ($SO_4^{2-}$) ppm values of the storage tank water. The sulfate measurements were made by FCL. The figure shows that the scrubbing efficiency starts to decrease at approximately 20 ppm of $SO_2$ absorbed in the tower. This value of 20 ppm also agrees with the FCL-$SO_4^{2-}$ ppm measurement. This also corresponds to a pH of between 5.5 and 6.0. Therefore it can be concluded that for fresh municipal water, the value of pH that reduces the DDD $SO_2$ scrubbing efficiency is between 5.5 and 6.0. It should be noted that there was a significant amount of sulfate (89.6 ppm) present in the storage tank water at the beginning of the experiments.

Sea Water Tests

As noted above, the recirculation mode experiments were conducted with seawater as well. The total time duration of these experiments is five (5) hours. The mass flow rates of air and sea water were kept at approximately 0.034 kg/sec and 0.105 kg/sec, respectively, throughout the experiment. These mass flow rates were selected to obtain a high water to air mass flow ratio of approximately 3.2. The inlet temperature of air to the diffusion tower was kept constant at approximately 90° C. At the beginning of the experiment, the sea water inlet temperature to the diffusion tower was kept at 36° C.; however as expected the sea water temperature in the storage tanks slowly increased to 40° C. by the end of the experiment. This increase was primarily due to the mixing of the hot sea water coming out of the diffusion tower recirculating through the storage tanks.

The $SO_2$ concentration going into the diffusion tower was kept at approximately 26 ppm during the course of the experiment. This low concentration of $SO_2$ together with the high water to air mass flow ratio in the tower ensured complete $SO_2$ scrubbing in the diffusion tower. The measured system operating parameters were sampled at regular intervals during the experiment. Water samples from the condenser and the storage tank were also collected during the course of the experiment and the value of pH was determined. These samples were stored and later sent to Flowers Chemical Laboratories (FCL), for determining TDS, pH and sulfate ($SO_4^{2-}$) concentration.

Figure 6:
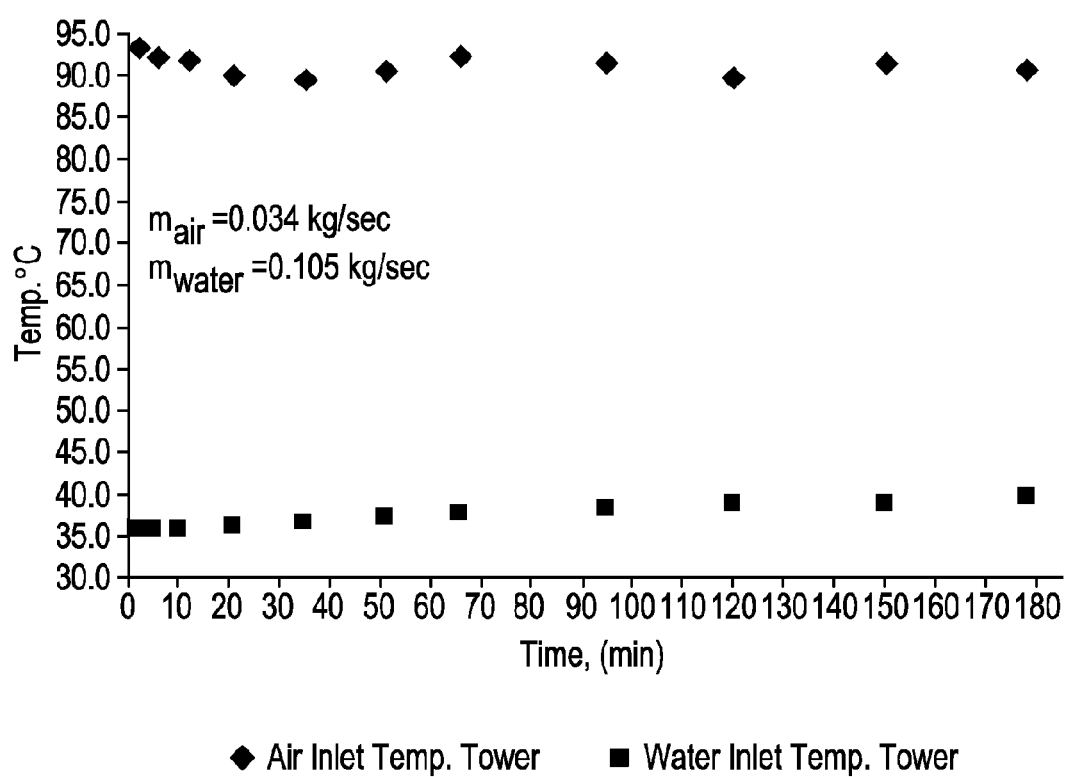
FIG. 6 is a graph that shows the variation of the diffusion tower inlet air temperature and water temperature versus time.
Figure 7:
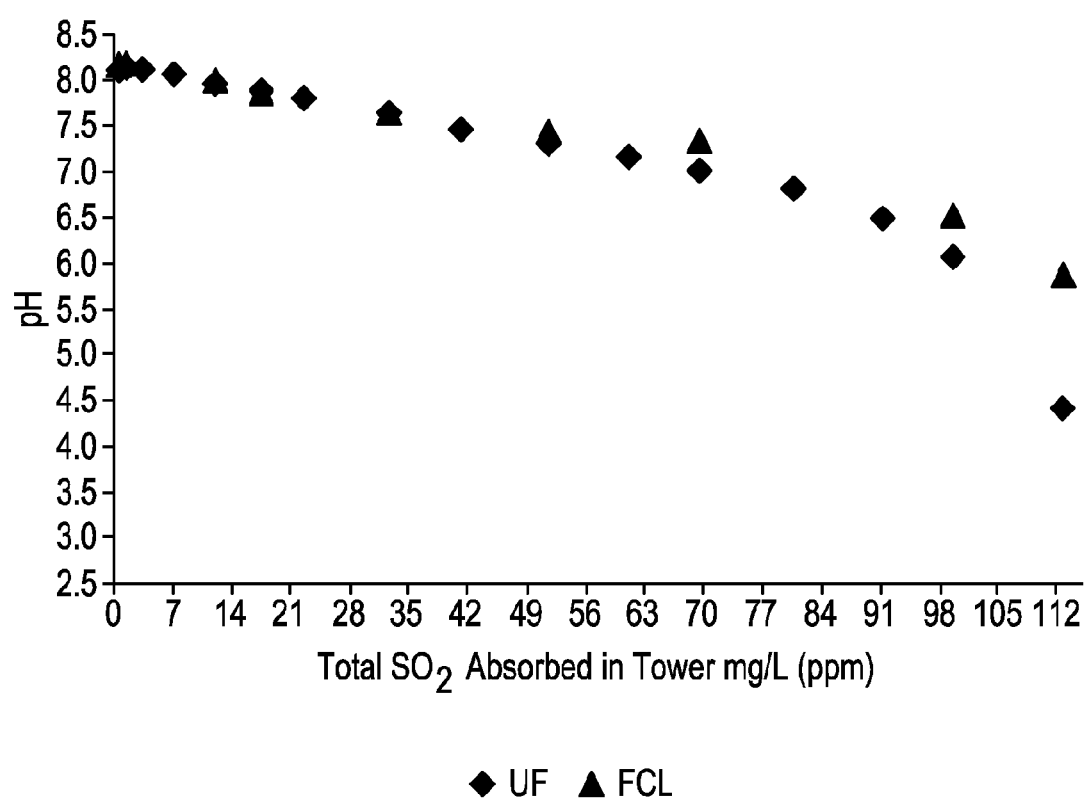
FIG. 7 is a graph that shows the decrease of pH in the storage tank sea water with the value of sulfur dioxide (in parts per million) absorbed in tower.

FIG. 6 shows the variation of the diffusion tower inlet air temperature and water temperature over time. FIG. 7 shows the decrease of pH in the storage tank sea water with the ppm values of $SO_2$ absorbed in tower. This implies that the water is becoming more acidic, which ultimately results in a decrease in the $SO_2$ scrubbing efficiency.

Figure 8:
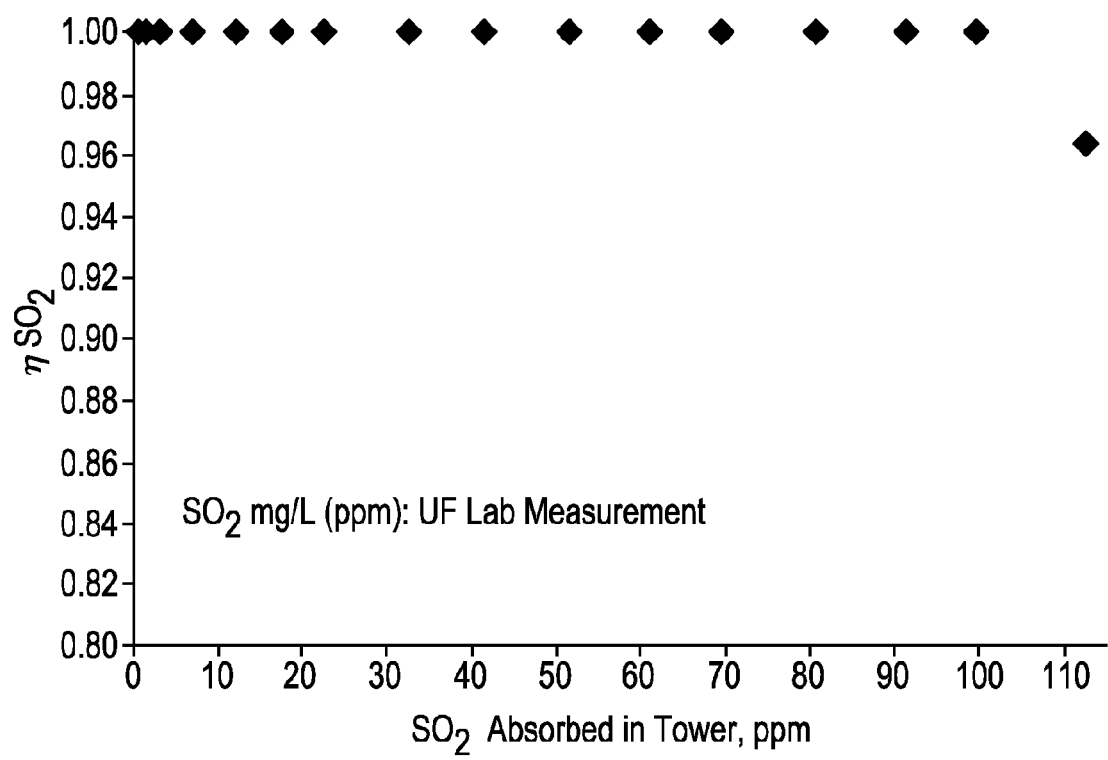
FIG. 8 is a graph that shows the sulfur dioxide scrubbing efficiency ($\eta_{SO2}$) versus increasing sulfur dioxide absorbed in the tower.
Figure 9:
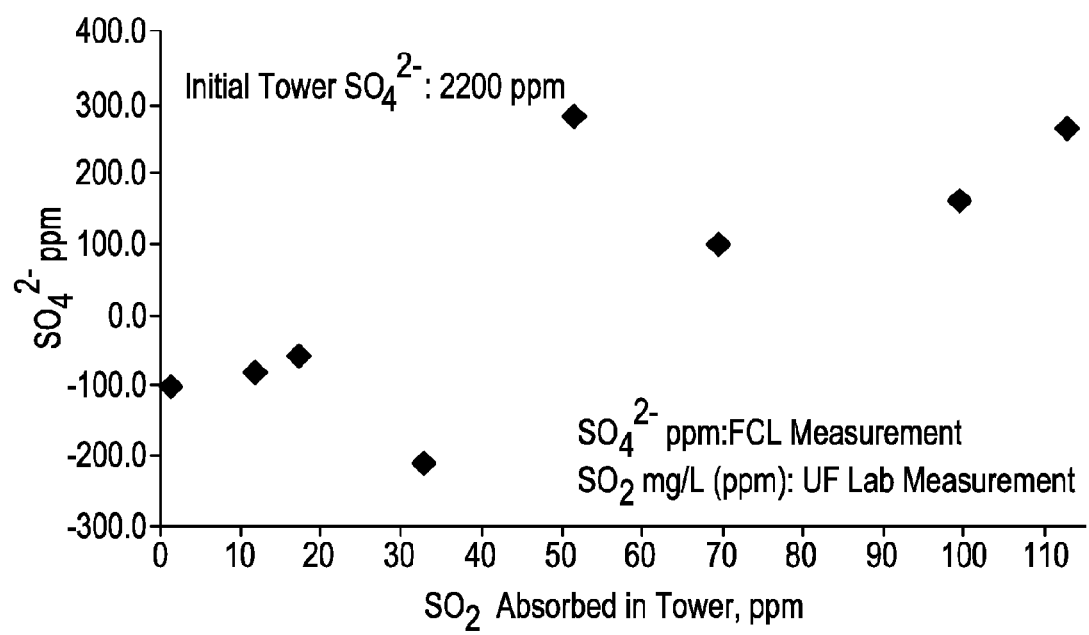
FIG. 9 is a graph that shows the sulfate ($SO_4^{-2}$) concentration versus increasing sulfur dioxide absorbed in the tower.

FIGS. 8 and 9 show the respective $SO_2$ scrubbing efficiency ($\eta_{SO2}$) and sea water sulfate ($SO_4^{-2}$) concentration with increasing $SO_2$ ppm absorbed in the tower. The sulfate measurements were made by FCL. It is observed that the scrubbing efficiency starts to decrease at approximately 100 ppm of $SO_2$ absorbed in the tower. This corresponds to a pH of approximately 6.0. Thus the pH that inhibits the sulfur scrubbing is approximately 6.0. This is consistent with the fresh water scrubbing tests. It should be noted that there was significant amount of sulfate (2200 ppm) present in the storage tank sea water at the beginning of the experiments.

From the aforementioned experiments it can be seen that scrubbing sulfur dioxide from the gaseous waste stream can be efficiently combined with desalination. As a result, fresh water can be obtained from sea water, while reducing or minimizing the discharging sulfur dioxide into the atmosphere.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention.

What is claimed is:

1. An apparatus comprising:
a source for a gaseous waste stream; the gaseous waste stream comprising sulfur dioxide;
a sensor, the sensor being operative to measure the concentration of sulfur dioxide present in the gaseous waste stream;
a diffusion tower; the feed water and the gaseous waste stream being configured to flow countercurrent to each other in the diffusion tower; the diffusion tower being disposed downstream of the source for the gaseous waste stream and in fluid communication with the source for the gaseous waste stream; the diffusion tower being operative to effect a transfer of sulfur dioxide from the gaseous waste stream to the feed water as well as to form a humidified gaseous waste stream; where the sensor is an electrochemical sensor and is disposed at an inlet to the diffusion tower; and
a direct contact condenser in fluid communication with the diffusion tower; the direct contact condenser being operative to receive the humidified gaseous waste stream from the diffusion tower and condensing the humidified gaseous waste stream, wherein purified water is produced upon condensation of the humidified gaseous waste stream.

2. The apparatus of claim 1, further comprising a water storage tank that contains the feed water; the storage tank being located upstream of the diffusion tower.

3. The apparatus of claim 2, wherein the feed water has a pH that is greater than or equal to about 8.

4. The apparatus of claim 3, wherein the feed water comprises fresh water, contaminated water, seawater or comprising at least one of fresh water, contaminated water or seawater.

5. The apparatus of claim 1, wherein the diffusion tower comprises at least one region that comprises a packing material; the packing material being operative to facilitate the formation of a thin film of water from the feed water.

6. The apparatus of claim 1, further comprising a heat exchanger that is operative to heat the feed water; the heat exchanger being located upstream of the diffusion tower.

7. The apparatus of claim 6, wherein the heat exchanger and the diffusion tower lie in a recirculating loop.

8. The apparatus of claim 1, wherein the humidified gaseous waste stream is condensed using fresh water; the fresh water and the humidified gaseous waste stream flowing countercurrent to each other in the direct contact condenser.

* * * * *